Patented Aug. 9, 1949

2,478,366

UNITED STATES PATENT OFFICE 2,478,366

POLYMETHINE DYES

Leslie G. S. Brooker and Frank L. White, Rochester, N. Y., assignors to Eastman Kodak Company, Rochester, N. Y., a corporation of New Jersey No Drawing. Application January 22, 1944, Serial No. 519,354

11 Claims. (Cl. 260—240)

This invention relates to polymethine dyes, to a process for preparing the same and to the sensitization of photographic emulsions with such dyes.

Trimethine cyanine dyes (carbocyanine dyes) containing alkyl groups on the terminal carbon atoms of the trimethine chain are known. Compared to the known trimethine cyanine dyes containing only hydrogen on the terminal carbon atoms, these alkyl substituted dyes absorb light of a wavelength somewhat farther toward the red and are weaker photographic sensitizers.

We have now found trimethine cyanine dyes containing alkoxyl or aryloxyl groups on one or both of the terminal carbon atoms of the trimethine chain. These dyes absorb light of a wavelength farther toward the red than do the corresponding dyes containing only hydrogen on the terminal carbon atoms, and many of the aryloxyl dyes are strong sensitizers for photographic emulsions. We have also found that dimethine dyes of the merocyanine series containing an alkoxyl or aryloxyl group on the dimethine chain can be prepared. These aryloxyl dyes are likewise strong sensitizers for photographic emulsions.

It is accordingly an object of our invention to provide new polymethine dyes and a process for the preparation thereof. It is a further object of our invention to provide photographic emulsions sensitized with such dyes. Other objects will become apparent hereinafter.

The trimethine cyanine dyes of our invention can be represented by the following general formula:

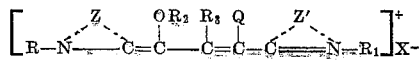

wherein R and $R_1$ represent alkyl groups of the formula $C_nH_{2n+1}$, $R_2$ represents a member selected from the group consisting of alkyl groups, aryl groups of the benzene series and aryl groups of the naphthalene series, $R_3$ represents a member selected from the group consisting of hydrogen and alkyl groups of the formula $C_nH_{2n+1}$, Q represents a member selected from the group consisting of hydrogen, alkoxyl groups, aryloxyl groups of the benzene series and aryloxyl groups of the naphthalene series, Z and Z' each represents the non-metallic atoms necessary to complete a heterocyclic nucleus selected from the group consisting of benzoxazole, benzothiazole, benzoselenazole, α-naphthoxazole, β-naphthoxazole, α-naphthothiazole and β-naphthothiazole nuclei, and X represents an anion. Of the dyes formulated above, those in which R and $R_1$ represent alkyl groups of the formula $C_nH_{2n+1}$ wherein $n$ represents a positive integer of from 1 to 2 are the stronger photographic sensitizers. The dyes wherein R and $R_1$ represent methyl groups are the strongest photographic sensitizers. The dyes wherein $R_3$ represents hydrogen are the stronger photographic sensitizers, the dyes wherein $R_3$ represents an alkyl group being of lesser utility as photographic sensitizers.

In accordance with our invention, we prepare our new symmetrical trimethine cyanine dyes by condensing an ester of an orthocarboxylic acid with a cyclammonium quaternary salt selected from the group consisting of those of the benzoxazole series, those of the benzothiazole series, those of the benzoselenazole series, those of the α-naphthoxazole series, those of the β-naphthoxazole series, those of the α-naphthothiazole series and those of the β-naphthothiazole series containing, in the α-position to the quaternary nitrogen atom, a group selected from the group consisting of alkoxymethyl groups, aryloxymethyl groups of the benzene series and aryloxymethyl groups of the naphthalene series. The condensations are advantageously carried out in the presence of a basic condensing agent. Pyridine is advantageously employed as the basic condensing agent.

The following examples will serve to illustrate our new symmetrical trimethine cyanine dyes and the manner of obtaining the same.

*Example 1.—8,10 - di(p-methoxyphenoxy) -3,3'-dimethyloxacarbocyanine perchlorate*

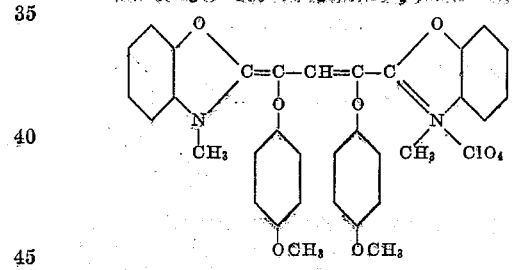

2.55 g. (2 mols.) of 2-(p-methoxyphenoxymethyl)-benzoxazole and 1.86 g. (2 mols.) of methyl p-toluenesulfonate were heated together at 95–100° C. for 20 hours. To the crude quaternary salt were added 10 cc. of dry pyridine and 2.22 g. (3 mols.) of ethyl orthoformate. The reaction mixture was heated at the refluxing temperature for 1 hour. The hot reddish-orange mixture was treated with a hot solution of 5 g. of sodium perchlorate in 50 cc. of water. After chilling overnight at 0° C., the aqueous layer was decanted and the sticky residue washed with water. The residue crystallized when it was stirred with 10 cc. of warm ethyl alcohol, and after chilling at 0° C., the dye was collected on a funnel and washed with ethyl alcohol. The yield of dye was 15 per cent crude and 7 per cent after two recrystallizations from ethyl alcohol (480 cc. per gram of dye). The minute dull reddish crystals with a blue reflex had melting point 258–259° C. with decomposition, and sensitized a photographic gelatino-silver bromo-iodide emulsion to about 600 mu. with maximum sensitivity at about 570 mu. The pinkish methyl alcoholic solution had maximum absorption at 5125 Å.

*Example 2.—3,3'-dimethyl-8,10-diphenoxy-5,5'-diphenyloxacarbocyanine perchlorate*

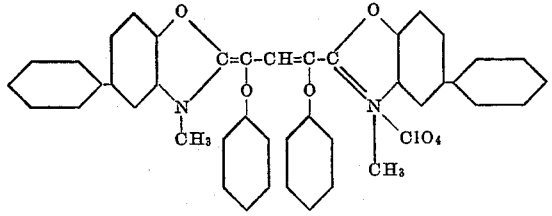

3.01 g. (2 mols.) of 2-phenoxymethyl-5-phenyl-benzoxazole and 1.26 g. (2 mols.) of methyl sulfate were heated together at 95–100° C. for 19 hours. To the crude quaternary salt were added 10 cc. of dry pyridine and 2.22 g. (3 mols.) of ethyl orthoformate and the reaction mixture was heated at the refluxing temperature for 30 minutes. The hot reddish-orange mixture was treated with a hot solution of 4 g. of sodium perchlorate in 40 cc. of water. After chilling the mixture at 0° C., the dye was collected on a funnel and washed with water. The residue was stirred, in a beaker, with 15 cc. of hot ethyl alcohol and after chilling the suspension at 0° C., the dye was collected on the funnel and washed with ethyl alcohol. The yield of dye was 78 per cent crude and 40 per cent after two recrystallizations from methyl alcohol (195 cc. per gram of dye). The minute red needles showed shrinking and softening from 195° C., and sensitized a photographic gelatino-silver-bromo-iodide emulsion to about 590 mu. with maximum sensitivity at about 565 mu. The pink methyl alcoholic solution had maximum absorption at 5235 Å.

*Example 3.—8,10-diethoxy-3,3'-dimethyloxacarbocyanine perchlorate*

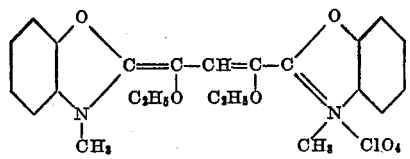

1.77 g. (2 mols.) of 2-ethoxymethylbenzoxazole and 1.26 g. (2 mols.) of methyl sulfate were heated together in an oil bath at 105–110° C. for 26 hours. To the crude quaternary salt were added 15 cc. of dry pyridine and 2.22 g. (3 mols.) of ethyl orthoformate and the reaction mixture was heated at the refluxing temperature for 30 minutes. The hot light reddish mixture was treated with a hot solution of 4 g. of sodium perchlorate in 100 cc. of water. After chilling at 0° C., the dye was collected on a funnel and washed with water. The residue was stirred, in a beaker, with 15 cc. of boiling ethyl alcohol and after chilling the suspension at 0° C., the product was collected on a funnel and washed with ethyl alcohol. The yield of dye was 46 per cent crude and 30 per cent after two recrystallizations from ethyl alcohol (90 cc. per gram of dye). The dark reddish crystals with dull greenish reflex had melting point 234–235° C. with decomposition, and sensitized a photographic gelatino-silver-bromo-iodide emulsion to about 590 mu. with maximum sensitivity at about 560 mu. The pinkish methyl alcoholic solution had maximum absorption at 5175 Å.

*Example 4.—3,3'-dimethyl-8,10-di(m-toloxy)-thiacarbocyanine bromide*

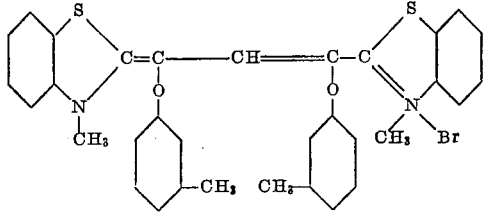

2.55 g. (2 mols.) of 2-(m-toloxymethyl)benzothiazole and 1.86 g. (2 mols.) of methyl p-toluenesulfonate were heated together at the temperature of the steam bath for 4½ hours. To the crude quaternary salt were added 15 cc. of dry pyridine and 2.96 g. (4 mols.) of ethyl orthoformate and the reaction mixture was heated at the refluxing temperature for 35 minutes. The cool purplish mixture was stirred with 175 cc. of ether, chilled at 0° C., and the solid collected on a funnel. The residue was dissolved in hot methyl alcohol and converted to the bromide by adding a hot solution of 4 g. of potassium bromide in 40 cc. of water. After chilling at 0° C., the solid was washed on a funnel with water. The residue was stirred, in a beaker, with hot acetone and after chilling the suspension at 0° C., the dye was washed on the funnel with acetone. The yield of dye was 64 per cent crude and 43 per cent after two recrystallizations from methyl alcohol (110 cc. per gram of dye). The brassy green crystals had melting point 234°–235° C. with decomposition, and sensitized a photographic gelatino-silver-bromo-iodide emulsion to about 670 mu. with maximum sensitivity at about 640 mu. The blue methyl alcoholic solution had maximum absorption at 5750 Å.

*Example 5.—8,10-di(p-chlorophenoxy)-3,3'-dimethylthiacarbocyanine p-toluenesulfonate*

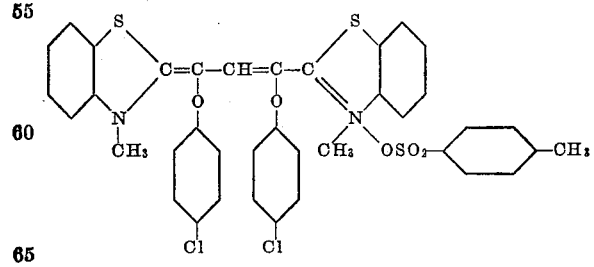

2.76 g. (2 mols.) of 2-(p-chlorophenoxymethyl)benzothiazole and 1.86 g. (2 mols.) of methyl p-toluenesulfonate were heated together at the temperature of the steam bath for two days. To the crude quaternary salt were added 20 cc. of dry pyridine and 2.22 g. (3 mols.) of ethyl orthoformate and the reaction mixture was heated at the refluxing temperature for 30 minutes. After chilling the reaction mixture at 0° C., the dye was washed on the funnel with acetone. The yield of dye was 84 per cent crude and 63 per cent after two recrystallizations from methyl alcohol (345 cc. per gram of dye). The purplish crystals had melting point 281–283° C. with decomposition, and sensitized a photographic gelatino-silver-bromo-iodide emulsion to about 670 mu. with maximum sensitivity at about 640 mu.

*Example 6.—3,3'-dimethyl - 8,10 - di(β - naphthoxy)thiacarbocyanine iodide*

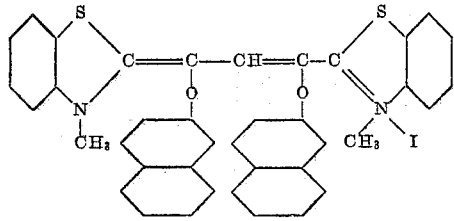

1.94 g. (2 mols.) of 2-(β-naphthoxymethyl)-benzothiazole and 1.24 g. (2 mols.) of methyl p-toluenesulfonate were heated together at the temperature of the steam bath for two days. To the crude quaternary salt were added 15 cc. of dry pyridine and 2.22 g. (3 mols.) of ethyl orthoformate and the reaction mixture was heated at the refluxing temperature for 30 minutes. The hot purple mixture was treated with a hot solution of 5 g. of potassium iodide in 50 cc. of water. After chilling at 0° C., the product was washed on the funnel with water. The residue was stirred, in a beaker, with 20 cc. of boiling acetone. After chilling the suspension at 0° C., the dye was washed on the funnel with acetone. The yield of dye was 24 per cent crude and 8 per cent after two recrystallizations from ethyl alcohol (80 cc. per gram of dye). The dull reddish crystalline powder had melting point 177°–179° C. with decomposition, and sensitized a photographic gelatino - silver - bromo-iodide emulsion from about 560 to about 670 mu. with maximum sensitivity at about 640 mu.

*Example 7.—8,10-diethoxy-3,3'-dimethylthiacarbocyanine iodide*

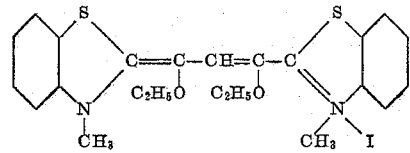

3.86 g. (2 mols.) of 2-ethoxymethylbenzothiazole and 3.72 g. (2 mols.) of methyl p-toluenesulfonate were heated at the temperature of the steam bath for one day. To the crude quaternary salt were added 10 cc. of dry pyridine and 4.44 g. (3 mols.) of ethyl orthoformate and the reaction mixture was heated at the refluxing temperature for 35 minutes. The hot bluish mixture was treated with a hot solution of 5 g. of potassium iodide in 50 cc. of water. After chilling at 0° C., the product was washed on the funnel with water. The residue was stirred, in a beaker, with hot acetone and the suspension chilled at 0° C. The dye was washed on the funnel with acetone. The yield of dye was 54 per cent crude and 31 per cent after two recrystallizations from ethyl alcohol (55 cc. per gram of dye). The dark green crystals had melting point 212–214° C. with decomposition, and sensitized a photographic gelatino - silver - bromo-iodide emulsion from about 570 to 690 mu. with maximum sensitivity at about 670 mu. The blue methyl alcoholic solution had maximum absorption at 5840 Å.

*Example 8.—3,3' - dimethyl - 8,10 - diphenoxy - 4,5,4',5'-dibenzoxacarbocyanine iodide*

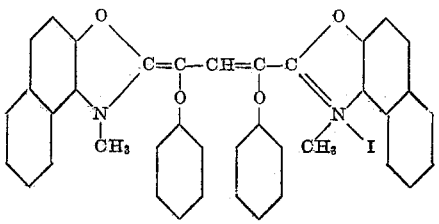

2.75 g. (2 mols.) of 2-phenoxymethyl-β-naphthoxazole and 1.26 g. (2 mols.) of methyl sulfate were heated together at 105–110° C. for 18 hours. To the crude quaternary salt were added 15 cc. of dry pyridine and 2.22 g. (3 mols.) of ethyl orthoformate and the reaction mixture was heated at the refluxing temperature for 20 minutes. The deep red reaction mixture was treated with a hot solution of 5 g. of potassium iodide in 50 cc. of water. After chilling at 0° C., the solids were washed on the funnel with water. The residue was stirred, in a beaker, with hot acetone and after chilling the suspension at 0° C., the dye was washed on the funnel with acetone. The yield of dye was 47 per cent crude and 26 per cent after two recrystallizations from methyl alcohol (100 cc. per gram of dye). The dark reddish crystals with a green reflex had melting point 220–223° C. with decomposition, and sensitized a photographic gelatino-silver-bromo-iodide emulsion to about 610 mu. with maximum sensitivity at about 580 mu.

*Example 9.—3,3' - dimethyl - 8,10 - diphenoxy - 6,7,6',7'-dibenzoxacarbocyanine methylsulfate*

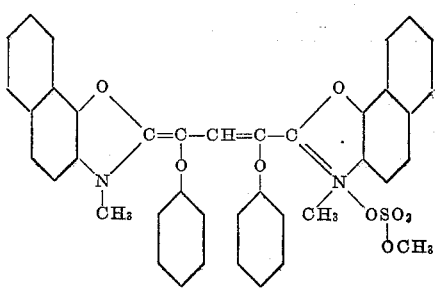

2.75 g. (2 mols.) of 2-phenoxymethyl-α-naphthoxazole and 1.26 g. (2 mols.) of methyl sulfate were heated together at 105–110° C. for two days. To the crude quaternary salt were added 10 cc. of dry pyridine and 2.22 g. (3 mols.) of ethyl orthoformate and the reaction mixture was heated at the refluxing temperature for 30 minutes. Some dye separated during the heating period. After chilling the light reddish mixture at 0° C., the dye was washed on the funnel with acetone followed by water. The residue was stirred, in a beaker, with hot acetone and after chilling the suspension at 0° C. the dye was washed on the funnel with acetone. The yield of dye was 42 per cent crude and 13 per cent after two recrystallizations from methyl alcohol (190 cc. per gram of dye). The dull red crystals with a green reflex had melting point 271–272° C. with decomposition, and sensitized a photographic gelatino-silver-bromo-iodide emulsion to about 610 mu. with maximum sensitivity at about 575 mu. The bluish red methyl alcoholic solution had maximum absorption at 5415 Å.

Example 10.—3,3'-dimethyl-8,10-diphenoxy-selenacarbocyanine bromide

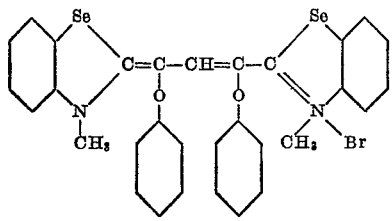

2.88 g. (2 mols.) of 2-phenoxymethylbenzoselenazole and 1.26 g. (2 mols.) of methyl sulfate were heated together at the temperature of the steam bath for 24 hours. To the crude quaternary salt were added 10 cc. of dry pyridine and 2.22 g. (3 mols.) of ethyl orthoformate and the reaction mixture was heated at the refluxing temperature for 20 minutes. The hot blue mixture was treated with a hot solution of 5 g. of potassium bromide in 50 cc. of water. After chilling at 0° C., the solid was collected on a funnel and washed with water. The residue was stirred, in a beaker, with 25 cc. of hot acetone and after chilling the suspension at 0° C., the product was washed on the funnel with acetone. The yield of crude dye was 37 per cent. The dye was purified by a combination of extraction and fractional recrystallization. The yield of pure dye was 11 per cent. The purplish crystalline powder had melting point 230—232° C. with decomposition, and sensitized a photographic gelatino-silver-bromo-iodide emulsion to about 670 mu. with maxima sensitivity at about 600 and 650 mu. The dull bluish methyl alcoholic solution had maximum absorption at 5825 Å.

Example 10a.—3,3'-dimethyl-8,10-diphenoxy-6,7,6',7'-dibenzothiacarbocyanine bromide

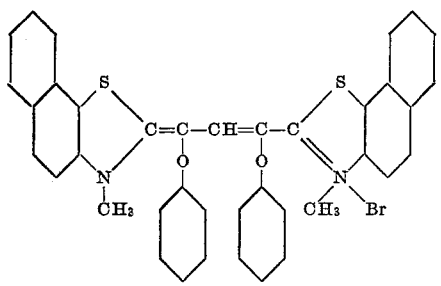

0.9 g. (2 mols.) of 2-phenoxymethyl-α-naphthothiazole and 0.6 g. (2 mols.) of methyl p-toluenesulfonate were heated together at 115°–120° C. for 4 hours. To the crude quaternary salt were added 20 cc. of dry pyridine and 0.9 g. (3 mols.) of ethyl orthoformate and the reaction mixture was heated at the refluxing temperature for 45 minutes. The cool mixture was stirred with ether, the liquors were decanted and the residue was washed with hot methyl alcohol and its solution was treated with an excess of potassium bromide in hot water. After chilling at 0° C., the dye was washed on the funnel with water. The yield of dye was 18 per cent crude and 9 per cent after one recrystallization from methyl alcohol (150 cc. per gram of dye). The mat of coppery crystals had melting point 200°–202° C. with decomposition. The dye sensitized a photographic gelatino-silver-bromiodide emulsion from about 550 mu. to about 670 mu. with maximum sensitivity at about 630 mu.

Example 10b.—3,3'-dimethyl-8,10-diphenoxy-4,5,4',5'-dibenzothiacarbocyanine bromide

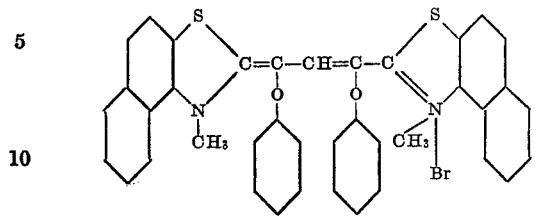

1.45 g. (2 mols.) of 2-phenoxymethyl-β-naphthothiazole and 0.95 g. (2 mols.) of methyl p-toluenesulfonate were heated together at 115°–120° C. for 5 days. To the crude viscous quaternary salt were added 20 cc. of dry pyridine and 3.0 g. (8 mols.) of ethyl orthoformate and the reaction mixture was heated at the refluxing temperature for 45 minutes. The cool blue mixture was stirred with 150 cc. of ether. The ether layer was decanted and the sticky residue was stirred with 200 cc. of water. The solids were washed on the funnel with hot water and after drying they were extracted with hot methyl alcohol. The hot alcoholic extract was treated with an excess of aqueous potassium bromide. After chilling at 0° C., the dye was washed on the funnel with water. The yield of dye was 14 per cent crude and 5 per cent after one recrystallization from methyl alcohol (160 cc. per gram of dye). The minute dark crystals had melting point 179°–181° C. with decomposition. The dye sensitized a photographic gelatino-silver-bromiodide emulsion from about 560 mu. to about 700 mu. with maximum sensitivity at about 640 mu.

In accordance with our invention, we prepare our new unsymmetrical trimethine cyanine dyes by condensing a cyclammonium quaternary salt selected from the group consisting of those of the benzoxazole series, those of the benzothiazole series, those of the benzoselenazole series, those of the α-naphthoxazole series, those of the β-naphthoxazole series, those of the α-naphthothiazole series and those of the β-naphthothiazole series, containing in the α-position to the quaternary nitrogen atom, a β-arylaminovinyl group, especially an acylated β-arylaminovinyl group, with a cyclammonium quaternary salt selected from the group consisting of those of the benzoxazole series, those of the benzothiazole series, those of the benzoselenazole series, those of the α-naphthoxazole series, those of the β-naphthoxazole series, those of the α-naphthothiazole series and those of the β-naphthothiazole series, containing, in the α-position to the quaternary nitrogen atom, a group selected from the group consisting of alkoxymethyl groups, aryloxymethyl groups of the benzene series and aryloxymethyl groups of the naphthalene series. We can also prepare our new unsymmetrical trimethine cyanine dyes by condensing a cyclammonium quaternary salt selected from the group consisting of those of the benzoxazole series, those of the benzothiazole series, those of the benzoselenazole series, those of the α-naphthoxazole series, those of the β-naphthoxazole series, those of the α-naphthothiazole series, and those of the β-naphthothiazole series, containing, in the α-position to the quarternary nitrogen atom, a methyl group, with a cyclammonium quaternary salt selected from the group consisting of those of the benzoxazole series, those of the benzothiazole series, those of the benzoselenazole series, those of the α-naphthoxazole series, those of the β-naphthoxazole series, those of the α-naphthothiazole series and those of the β-naphthothiazole series, containing, in the α-position to the quaternary nitrogen atom, a β-arylamino-α-alkoxy- or aryloxyvinyl group. In either case, the condensations are advantageously carried out in the presence of a basic condensing agent. A pyridine solution of a trialkylamine, such as triethylamine, is advantageously employed as basic condensing agents. Heat accelerates the condensations.

Our unsymmetrical trimethine cyanine dyes can also be prepared by condensing, in the presence of an anhydride of a carboxylic acid, e. g. acetic anhydride or propionic anhydride, a cyclammonium quaternary salt selected from the group consisting of those of the benzoxazole series, those of the benzothiazole series, those of the benzoselenazole series, those of the α-naphthoxazole series, those of the β-naphthoxazole series, those of the α-naphthothiazole series and those of the β-naphthothiazole series, containing, in the α-position to the quaternary nitrogen atom, a methyl group, with a ketone derivative obtained by condensing a chloride of a carboxylic acid, in the presence of a basic condensing agent, with a cyclammonium quaternary salt selected from the group consisting of those of the benzoxazole series, those of the benzothiazole series, those of the benzoselenazole series, those of the α-naphthoxazole series, those of the β-naphthoxazole series, those of the α-naphthothiazole series and those of the β-naphthothiazole series, containing, in the α-position to the quaternary nitrogen atom, a group selected from the group consisting of alkoxymethyl groups, aryloxymethyl groups of the benzene series and aryloxymethyl groups of the naphthalene series.

The following examples will serve to illustrate our new unsymmetrical trimethine cyanine dyes and the manner of obtaining the same:

*Example 11.—3'-ethyl-3-methyl-8-phenoxythiacarbocyanine iodide*

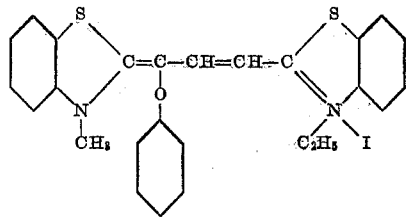

1.6 g. (1 mol.) of 2-phenoxymethylbenzothiazole and 1.3 g. (1 mol.) of methyl p-toluenesulfonate were heated together at the temperature of the steam bath for 4 hours. To the crude quaternary salt were added 15 cc. of dry pyridine, 3.0 g. (1 mol.) of 2-(β-acetanilidovinyl) benzothiazole ethiodide and 0.67 g. (1 mol.) of triethylamine. This reaction mixture was heated at the refluxing temperature for 7 minutes with frequent shaking. The cool mixture was stirred with 200 cc. of ether and after chilling the suspension at 0° C., the solid was collected on a filter and washed first with ether and then water. The residue was stirred, in a beaker, with 20 cc. of boiling acetone and after chilling the suspension at 0° C., the dye was washed on the filter with acetone. The yield of dye was 42 per cent crude and 22 per cent after two recrystallizations from methyl alcohol (120 cc. per gram of dye). The dark green crystals had melting point 212°–214° C. with decomposition, and sensitized a photographic gelatino-silver-bromo-iodide emulsion from about 540 to 640 mμ. with maximum sensitivity at about 625 mμ.

*Example 12.—3'-ethyl-3,9-dimethyl-8-phenoxythiacarbocyanine iodide*

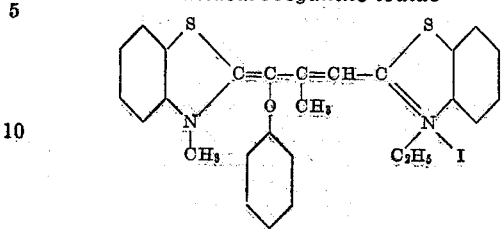

0.74 g. (1 mol.) of 2-(acetylphenoxymethylene)-3-methylbenzothiazoline, 0.87 g. (1 mol.) of 2-methylbenzothiazole etho-p-toluenesulfonate and 5 cc. of acetic anhydride were heated together at the refluxing temperature for 15 minutes. The cool reaction mixture was stirred with 200 cc. of ether and after chilling the whole at 0° C., the liquors were decanted and the sticky residue washed with ether. The residue was dissolved in hot methyl alcohol and its solution was treated with a hot solution of 2 g. of potassium iodide in 20 cc. of water. After chilling at 0° C., the solids were collected on a filter and washed with water. The residue was stirred, in a beaker, with hot acetone and after chilling the suspension at 0° C., the dye was washed on the funnel with acetone. The crude dye (.15 g.) was dissolved in 15 cc. of ethyl alcohol. The dye which separated on chilling was not the desired dye. The combined filtrate and washings was concentrated and on chilling there was obtained 0.05 g., which was given a further recrystallization from 3 cc. of ethyl alcohol. The dull bluish granular crystals had melting point 140–141° C. with decomposition, and sensitized a photographic gelatino-silver-bromo-iodide emulsion to about 670 mμ. with maximum sensitivity at about 650 mμ.

*Example 13.—3,3'-diethyl-10-phenoxyoxathiacarbocyanine perchlorate*

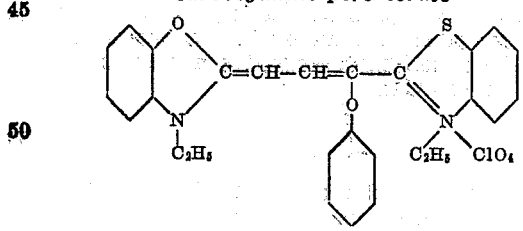

2.41 g. (1 mol.) of 2-phenoxymethylbenzothiazole and 2.00 g. (1 mol.) of ethyl p-toluenesulfonate were heated together at the temperature of the steam bath for three days. To the crude quaternary salt were added 4.34 g. (1 mol.) of 2-(β-acetanilidovinyl)benzoxazole ethiodide, 10 cc. of dry pyridine and 1.06 g. (1 mol.+5 per cent) of triethylamine. This mixture was heated at the refluxing temperature for 15 minutes. The cool mixture was stirred with 200 cc. of ether. After chilling at 0° C., the liquors were decanted and the sticky residue washed with ether. The residue was dissolved in hot methyl alcohol and the solution was treated with a hot solution of 4 g. of sodium perchlorate in 40 cc. of water and the whole chilled. The solid was washed on the filter with water. The residue was stirred, in a beaker, with hot ethyl alcohol and after chilling the suspension the dye was washed on the funnel with ethyl alcohol. The green and reddish crystals had melting point 187–188° C. with decomposition, and sensitized a photographic gelatino-silver-bromo-iodide emulsion to about 600 mu. with maximum sensitivity at about 580 mu.

The dimethine merocyanine dyes of our invention can be represented by the following formula:

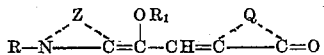

wherein R represents an alkyl group of the formula $C_nH_{2n+1}$, $R_1$ represents a member selected from the group consisting of alkyl groups, aryl groups of the benzene series and aryl groups of the naphthalene series, Z represents the non-metallic atoms necessary to complete a heterocyclic nucleus selected from the group consisting of those of the benzoxazole series, those of the benzothiazole series, those of the benzoselenazole series, those of the α-naphthoxazole series, those of the β-naphthoxazole series, those of the α-naphthothiazole series and those of the β-naphthothiazole series, and Q represents the non-metallic atoms necessary to complete a heterocyclic nucleus, such as a rhodanine nucleus, e. g. 3-alkyl rhodanine nucleus, or a 3-alkyl-2-thio-2,4(3,5)-oxazoledione nucleus. Of the dyes formulated above, only those in which R represents an alkyl group of the formula $C_nH_{2n+1}$, wherein $n$ represents a positive integer of from 1 to 2 sensitizes photographic emulsions to any substantial extent. The dyes wherein R represents a methyl group are the stronger photographic sensitizers.

In accordance with our invention, we prepare our new dimethine merocyanine dyes by condensing a cyclammonium quaternary salt selected from the group consisting of those of the benzoxazole series, those of the benzothiazole series, those of the benzoselenazole series, those of the α-naphthoxazole series, those of the β-naphthoxazole series, those of the α-naphthothiazole series and those of the β-naphthothiazole series containing in the α-position to the quaternary nitrogen atom a group selected from the group consisting of alkoxymethyl groups, aryloxymethyl groups of the benzene series and aryloxymethyl groups of the naphthalene series, with a heterocyclic compound containing in the heterocyclic ring a keto methylene group, i. e. a group of the following formula:

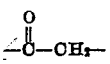

in which the two hydrogen atoms of the methylene group have been replaced by an acylated arylamino methylene group. The condensations are advantageously carried out in the presence of a basic condensing agent. An alcoholic solution of a trialkylamine, e. g. triethylamine, or a N-alkyl piperidine, e. g. N-methyl piperidine is advantageously employed as basic condensing agents. Heat accelerates the condensations.

Our new dimethine merocyanine dyes can also be prepared by condensing a cyclammonium quaternary salt selected from the group consisting of those of the benzoxazole series, those of the benzothiazole series, those of the benzoselenazole series, those of the α-naphthoxazole series, those of the β-naphthoxazole series, those of the α-naphthothiazole series and those of the β-naphthothiazole series, containing in the α-position to the quaternary nitrogen atom, a β-arylamino-α-alkoxy- or aryloxyvinyl group, with a heterocyclic compound containing a keto methylene group, such as a 3-alkylrhodanine or a 3-alkyl-2-thio-2,4(3,5)-oxazoledione. The condensations are advantageously carried out in the presence of a basic condensing agent, such as an alcoholic solution of a trialkylamine, e. g. triethylamine, or a N-alkylpiperidine, e. g. N-methylpiperidine.

The following examples will serve to illustrate our new dimethine merocyanine dyes and the manner of obtaining the same.

*Example 14.—3-ethyl-5-[(3-methyl-2(3)-benzothiazolylidene)-β-phenoxyethylidene]rhodanine*

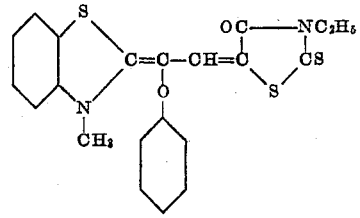

2.3 g. (1 mol.) of 2-(β-acetanilido-α-phenoxyvinyl)-benzothiazole methiodide, 0.7 g. (1 mol.) of 3-ethylrhodanine, 10 cc. of ethyl alcohol and 0.46 g. (1 mol.+5 per cent) of triethylamine were heated at the refluxing temperature for 15 minutes. The cool reddish mixture was stirred with 150 cc. of ether and the suspension was chilled at 0° C., filtered and the solid was washed with ether. The residue was stirred with 10 cc. of hot ethyl alcohol and after chilling at 0° C. the dye was washed on the filter with ethyl alcohol. The yield of dye was 32 per cent crude and 10 per cent after one recrystallization from methyl alcohol (140 cc. per gram of dye). The purple crystals had melting point 197–199° C. with decomposition, and sensitized a photographic gelatino-silver-bromo-iodide emulsion to about 650 mu. with maximum sensitivity at about 615 mu.

*Example 15.—3-ethyl-5-[(3-methyl-2(3)-benzothiazolylidene)-β-(m-toloxy) ethylidene]rhodanine*

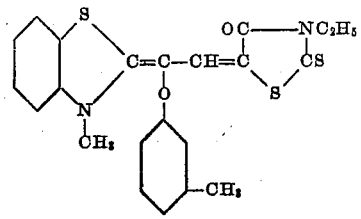

2.55 g. (1 mol.) of 2-(m-toloxymethyl)benzothiazole and 1.26 g. (1 mol.) of methyl sulfate were heated together at the temperature of the steam bath for 8 hours. To the crude quaternary salt were added 3.06 g. (1 mol.) of 5-acetanilidomethylene-3-ethylrhodanine, 10 cc. of ethyl alcohol and 1.06 g. (1 mol. + 5 per cent excess) of triethylamine. This reaction mixture was heated at the refluxing temperature for 20 minutes. After chilling at 0° C., the solid was collected on a funnel and washed with ethyl alcohol. The residue was stirred, in a beaker, with hot ethyl alcohol and after chilling the suspension at 0° C., the dye was washed on the funnel with ethyl alcohol. The yield of dye was 67 per cent crude and 33 per cent after two recrystallizations from acetone (135 cc. per gram of dye). The minute dark red crystals with a green reflex had melting point 228–229° C. with decomposition, and sensitized a photographic gelatino-silver-bromo-iodide emulsion to about 650 mu. with maximum sensitivity at about 615 mu.

*Example 16.—3-ethyl-5-[(3 - methyl-2(3)-benzothiazolylidene) - β -(m-toloxy) ethylidene]-2-thio-2,4(3,5)-oxazoledione*

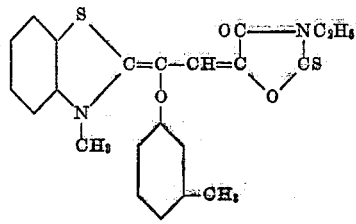

2.55 g. (1 mol.) of 2-(m-toloxymethyl)benzothiazole and 1.26 g. (1 mol.) of methyl sulfate were heated together at the temperature of the steam bath for 8 hours. To the crude quaternary salt were added 2.90 g. (1 mol.) of 5-acetanilidomethylene-3-ethyl-2-thio-2,4(3,5)-oxazoledione, 10 cc. of ethyl alcohol and 1.06 g. (1 mol.+5 per cent excess) of triethylamine. This reaction mixture was heated at the refluxing temperature for 20 minutes. After chilling the mixture at 0° C., the solid was collected on a funnel and washed with ethyl alcohol. The residue was stirred, in a beaker, with hot ethyl alcohol and after chilling the suspension at 0° C., the solid was washed on a funnel with ethyl alcohol. The yield of dye was 73 per cent crude and 59 per cent after two recrystallizations from ethyl alcohol (165 cc. per gram of dye). The reddish-orange crystals with a green reflex had melting point 195°–197° C. with decomposition, and sensitized a photographic gelatino-silver-bromo-iodide emulsion to about 620 mu. with maximum sensitivity at about 580 mu.

*Example 17.—3-ethyl-5-[(3-ethyl - 2(3)-benzothiazolylidene) - β -(m-toloxy) ethylidene]rhodanine*

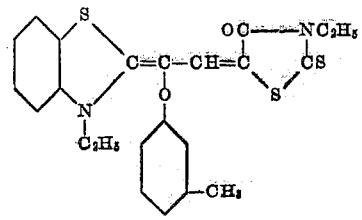

2.55 g. (1 mol.) of 2-(m-toloxymethyl)benzothiazole and 1.54 g. (1 mol.) of ethyl sulfate were heated together at 105–110° C. for 4 days. To the crude quaternary salt were added 3.06 g. (1 mol.) of 5-acetanilidomethylene-3-ethylrhodanine, 10 cc. of ethyl alcohol and 1.06 g. (1 mol. + 5 per cent excess) of triethylamine. This reaction mixture was heated at the refluxing temperature for 20 minutes. The cool mixture was stirred with 300 cc. of ether and after chilling at 0° C., the solid was washed on a funnel with ether. The residue was stirred, in a beaker, with hot ethyl alcohol and after chilling at 0° C., the product was washed on a funnel with ethyl alcohol. The yield of dye was 25 per cent crude and 17 per cent after two recrystallizations from acetone (50 cc. per gram of dye). The dark red crystals with a green reflex had melting point 210–211° C. with decomposition, and sensitized a photographic gelatino-silver-bromo-iodide emulsion to about 650 mu. with maximum sensitivity at about 610 mu.

*Example 18.—3-ethyl - 5-[(3-ethyl-2(3)-benzothiazolylidene) - β -(m-toloxy) ethylidene]-2-thio-2,4(3,5)-oxazoledione*

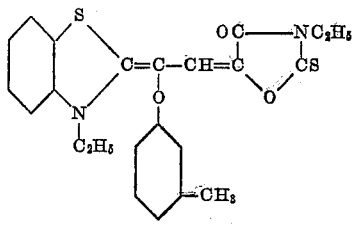

2.55 g. (1 mol.) of 2-(m-toloxymethyl)benzothiazole and 1.54 g. (1 mol.) of ethyl sulfate were heated together at 105–110° C. for 4 days. To the crude quaternary salt were added 2.90 g. (1 mol.) of 5-acetanilidomethylene-3-ethyl-2-thio-2,4(3,5)-oxazoledione, 10 cc. of ethyl alcohol and 1.06 g. (1 mol. + 5 per cent excess) of triethylamine. This reaction mixture was heated at the refluxing temperature for 20 minutes. The cool mixture was stirred with 150 cc. of ether and after chilling a 0° C., the solid was washed on a funnel with ether. The residue was stirred, in a beaker, with 10 cc. of hot ethyl alcohol and after chilling the suspension at 0° C., the product was washed on a funnel with ethyl alcohol. The yield of dye was 66 per cent crude and 46 per cent after two recrystallizations from acetone (120 cc. per gram of dye). The orange-red needles with a green reflex had melting point 223°–224° C. with decomposition, and sensitized a photographic gelatino-silver-bromo-iodide emulsion to about 610 mu. with maximum sensitivity at about 580 mu.

*Example 19.—3 - ethyl - 5 - [(3-methyl-2(3)-benzoxazolylidene) - β - (p-chlorophenoxy) ethylidene]rhodanine*

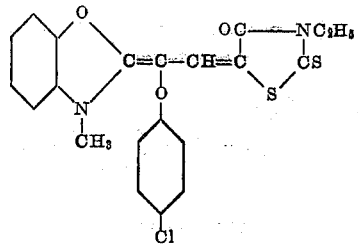

2.60 g. (1 mol.) of 2-(p-chlorophenoxymethyl)-benzoxazole and 1.26 g. (1 mol.) of methyl sulfate were heated together at 105–110° C. for 37 hours. To the crude quaternary salt were added 3.06 g. (1 mol.) of 5-acetanilidomethylene-3-ethyl rhodanine, 15 cc. of dry pyridine and 1.01 g. (1 mol.) of triethylamine. This reaction mixture was heated at the refluxing temperature for 25 minutes. The cool mixture was stirred with 200 cc. of ether and after chilling at 0° C. the solids were collected on a filter and washed with ether. The residue was stirred, in a beaker, with 10 cc. of hot ethyl alcohol and after chilling the suspension at 0° C., the solid was washed on a filter with ethyl alcohol. The dye was recrystallized twice from acetone (110 cc. per gram of dye) and obtained in a 6 per cent yield. The light red crystals with a blue reflex had melting point 283–284° C. with decomposition, and sensitized a photographic gelatino-silver-bromo-iodide emulsion to about 610 mu. with maximum sensitivity at about 575 mu.

*Example 20.*—*3 - ethyl - 5 - [ (5-chloro-3-methyl-2 (3) - benzoxazolylidene) - β - phenoxyethylidene]-2-thio-2,4(3,5)-oxazoledione*

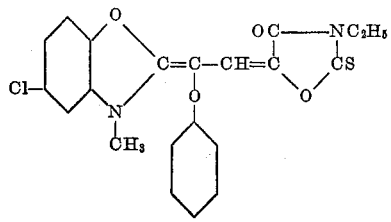

2.60 g. (1 mol.) of 5-chloro-2-phenoxymethyl-benzoxazole and 1.26 g. (1 mol.) of methyl sulfate were heated together at 105–110° C. for 37 hours. To the crude quaternary salt were added 2.90 g. (1 mol.) of 5-acetanilidomethylene-3-ethyl-2-thio-2,4(3,5)-oxazoledione, 15 cc. of pyridine and 1.01 g. (1 mol.) of triethylamine. This reaction mixture was heated at the refluxing temperature for 25 minutes. The cool reaction mixture was stirred with 150 cc. of ether and after chilling at 0° C., the solid was washed on a funnel with ether. The residue was stirred, in a beaker, with 10 cc. of hot ethyl alcohol and after chilling the suspension at 0° C., the product was washed on a funnel with ethyl alcohol. The yield of dye was 16 per cent crude and 9 per cent after two recrystallizations from acetone (325 cc. per gram of dye). The minute light orange crystals had melting point 291–292° C. with decomposition, and sensitized a photographic gelatino-silver-bromo-iodide emulsion to about 560 mu.

The cyclammonium quaternary salts containing, in the α-position, an alkoxymethyl group or an aryloxymethyl group are prepared as shown in the foregoing examples, by adding an alkyl salt to heterocyclic bases containing an alkoxymethyl or an aryloxymethyl group, in the α-position. The following examples will serve to illustrate the preparation of these heterocyclic bases.

*Example 21.* — *2 - (p - methoxyphenoxymethyl)-benzoxazole*

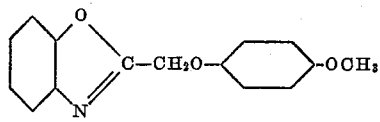

40.3 g. of 2-(p-methoxyphenoxyacetylamino)-phenol and 13 g. of phosphorus pentoxide were intimately mixed and the mixture was heated at 170° C. for 30 minutes. The liquid portion was poured, with stirring, into 800 cc. of 3 per cent aqueous sodium carbonate and the residue remaining in the reaction flask was treated with 200 cc. of hot 3 per cent aqueous sodium carbonate. Both portions were combined and thoroughly extracted with ether. The ether layer was collected and washed with water. After distilling off the ether, the residue distilled at 182°–190° C. at 2 mm. The product was poured into a small volume of methyl alcohol. After chilling, the crystals were washed on the funnel with methyl alcohol. The yield of colorless crystals was 46 per cent and they had melting point 48°–50° C.

The 2 - (p-methoxyphenoxyacetylamino) -phenol was prepared as follows:

15.1 g. (1 mol.) of o-aminophenol was dissolved in 50 cc. of pyridine and 27.8 g. (1 mol.) of p-methoxyphenoxyacetyl chloride was added slowly, with shaking, and then the mixture was heated at the temperature of the steam bath for 20 minutes. The mixture was poured, with stirring, into a solution of 20 g. of sodium carbonate dissolved in about 2 liters of water. The product separated as a sticky mass. The aqueous layer was decanted and the residue washed with water. It was dissolved in alcohol and precipitated by the addition of water. The product remained sticky. It was air dried and used without further purification.

The p-methoxyphenoxyacetyl chloride employed above was prepared as follows:

A mixture of 59.2 g. (1 mol.) of p-methoxyphenoxy acetic acid and 71.6 g. (2 mols.) of thionyl chloride was heated in a water bath having a temperature of 70°–75° C. for 2 hours. The mixture was distilled and the fraction distilling at 145°–152° C. at 15 mm. was collected as the acid chloride. Yield 94 per cent.

In a similar manner, 2-phenoxymethyl-5-phenylbenzoxazole was prepared as colorless crystals melting at 91°–92° C. Also in a similar manner, 5 - chloro-2-phenoxymethylbenzoxazole was prepared as colorless crystals melting at 85°–88° C., 2-(p-chlorophenoxymethyl)-benzoxazole was prepared as colorless crystals melting at 85°–86° C., 2-phenoxymethyl-β-naphthoxazole was prepared as colorless crystals melting at 72°–75° C. and 2-phenoxymethyl-α-naphthoxazole was prepared as colorless crystals melting at 102°–105° C.

*Example 22.*—*2-ethoxymethylbenzoxazole*

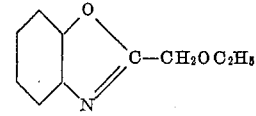

24 g. of ethoxyacetylaminophenol and 9 g. of phosphorus pentoxide were intimately mixed and the mixture was heated at 170° C. for 30 minutes. The reaction mixture was poured into 1 liter of 3 per cent aqueous sodium carbonate and the base extracted with ether. The ether layer was collected and washed with water. After distilling off the ether, the residue was distilled, and the distillate redistilled at 125°–132° C. at 20 mm. The yield of clear liquid was 23 per cent.

The 2-ethoxyacetylaminophenol was prepared as follows:

21.8 g. (1 mol) of o-aminophenol was dissolved in 50 cc. of pyridine and 24.5 g. (1 mol.) of ethoxyacetyl chloride was added slowly, with shaking, and then the reaction mixture was heated at the temperature of the steam bath for 20 minutes. The mixture was poured, with stirring, into a solution of 20 g. of sodium carbonate dissolved in about 2 liters of water. The colorless crystals were washed, on the funnel, with cold water and the yield was 64 per cent.

*Example 23.*—*m-toloxymethylbenzothiazole*

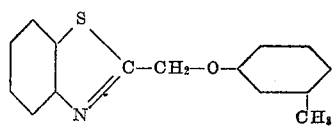

A solution of 55.2 g. (2 mols.) of m-toloxyacetyl chloride in 100 cc. of dry benzene was added over a period of 2 minutes to a suspension of 47 g. (1 mol.) of zinc o-aminophenylmercaptide and 11 g. of zinc chloride in 350 cc. of dry benzene with mechanical stirring. After 15 minutes at room temperature, the mixture was heated at the refluxing temperature for 45 minutes and filtered hot. The benzene filtrate was washed, in a separatory funnel, with 500 cc. of about 11 per cent sodium hydroxide and then three times with water. The residue obtained from filtering the reaction mixture was stirred, in a beaker, with 500 cc. of about 17 per cent sodium hydroxide and 300 cc. of benzene. After filtering, by gravity, the benzene layer was collected and washed with water. The benzene extracts were combined, dried over potassium carbonate, and the filtrate distilled. The fraction, which distilled at 193°–210° C. at 3 mm. was poured into ligroin (boiling point 60°–90° C.) and after chilling, the colorless crystals were washed on the funnel with ligroin. They had melting point 83°–85° C. The yield of base was 52 per cent crude and 32 per cent after the ligroin recrystallization.

In a similar manner, 2-ethoxymethylbenzothiazole boiling at 142°–147° C. at 10 mm. of mercury pressure was prepared, 2-(β-naphthoxymethyl)-benzothiazole was prepared, p-chlorophenoxymethylbenzothiazole boiling at 225°–235° C. at 3 mm. of mercury pressure and melting at 83°–85° C. was prepared, 2-phenoxymethylbenzothiazole was prepared and 2-phenoxymethylbenzoselenazole melting at 100°–105° C. was prepared.

*Example 24.—2-phenoxymethyl-α-naphthothiazole*

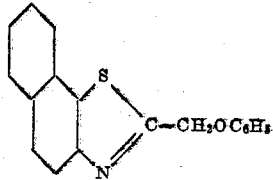

55.4 g. of phenoxyacetyl-β-naphthylamine and 50 cc. of dry pyridine were heated together, in an oil bath having a temperature of 115°–120° C. To this hot solution was added slowly 22 g. of phosphorus pentasulfide with mechanical stirring and the mixture was heated for about 15 minutes. After pouring the reaction mixture onto cracked ice an excess of acetic acid was added. The phenoxythioacetyl-β-naphthylamine, which separated was collected on a funnel. It was redissolved in an excess of dilute sodium hydroxide. The solution was filtered and to the filtrate was added some cracked ice and then an excess of acetic acid. Again the phenoxythioacetyl-β-naphthylamine, which separated was collected on a funnel. It was redissolved in an excess of dilute sodium hydroxide, cracked ice added and oxidized to the desired base by the addition of aqueous potassium ferricyanide until the mixture was permanently yellow. The base was removed by extraction with ether. The ether layer was washed with water and then it was dried over potassium carbonate. After filtering, the filtrate was concentrated and the residue recrystallized from ligroin (boiling point 90°–120° C.). The almost colorless crystals had melting point 118°–120° C.

*Example 25.—2-phenoxymethyl-β-naphthothiazole*

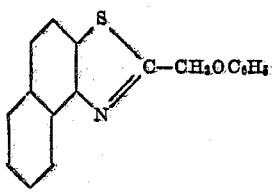

55.4 g. of phenoxyacetyl-α-naphthylamine and 250 cc. of dry benzene were heated to the refluxing temperature with mechanical stirring and 22 g. of phosphorus pentasulfide was added slowly and heating was continued for 20 minutes. The hot benzene layer was poured onto an equal volume of cracked ice and an excess of sodium hydroxide was added. The aqueous alkaline layer was isolated and made acid with acetic acid. The phenoxythioacetyl-α-naphthylamine, which separated was collected on a funnel and redissolved in an excess of warm dilute sodium hydroxide. After filtering the solution, to the filtrate was added some cracked ice and then an excess of acetic acid. Again the phenoxythioacetyl-α-naphthylamine, which separated was collected on a funnel. It was redissolved in an excess of dilute sodium hydroxide, and oxidized to the desired base by the addition of aqueous potassium ferricyanide to the ice cold mixture until it was permanently yellow. The base was removed by extraction with ether. The ether layer was washed with water and then it was dried over potassium carbonate. After filtering, the filtrate was concentrated and the residue twice recrystallized from methyl alcohol. The almost colorless crystals had melting point 116°–118° C.

The phenoxyacetyl-α-naphthylamine and phenoxyacetyl-β-naphthylamine employed in Examples 24 and 25 were prepared as follows:

43 g. (1 mol.) of α-naphthylamine and 51 g. (1 mol.) of phenoxyacetyl chloride were mixed together. After the vigorous reaction had subsided the mixture was heated on the steam bath for 15 minutes. The product was removed from the flask, crushed and washed on the funnel with water and then it was recrystallized from methyl alcohol. The colorless crystals were obtained in an 80 per cent yield and they had melting point 129°–131° C.

43 g. (1 mol.) of β-naphthylamine, 51 g. (1 mol.) of phenoxyacetyl chloride and 20 cc. of pyridine were mixed together. The mixture was heated at the temperature of the steam-bath for 15 minutes. The product was removed from the flask, crushed and washed on the funnel with water. It was recrystallized from methyl alcohol. The colorless crystals were obtained in a 72 per cent yield and they had melting point 140°–142° C.

The cyclammonium quaternary salts containing, in the α-position to the quaternary nitrogen atom, a β-arylamino-α-alkoxy- or aryloxyvinyl group can be prepared by condensing a cyclammonium quaternary salt containing an alkoxymethyl or aryloxymethyl group with a diarylformamidine, in the presence of an anhydride of a carboxylic acid. The following example will serve to illustrate the preparation of such cyclammonium quaternary salts.

*Example 26.—2-(β-acetanilido-α-phenoxyvinyl) benzothiazole methiodide*

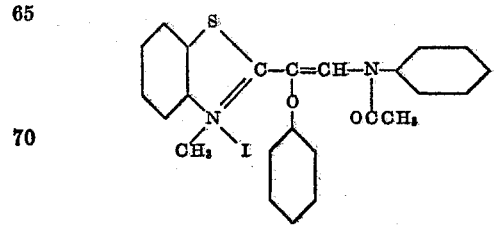

4.7 g. (1 mol.) of 2-phenoxymethylbenzothiazole methiodide, prepared by heating the base and methyl iodide together at the refluxing temperature for 12 hours, and 2.42 g. (1 mol.) of diphenylformamidine were heated together in 10 cc. of acetic anhydride at the refluxing temperature for 17 minutes. The dark brown mixture was chilled overnight at 0° C., and the crystals were collected on a funnel and washed with acetone. The residue was stirred, in a beaker, with 20 cc. of warm acetone and after chilling the suspension at 0° C., the brown product was washed on the funnel with acetone. It was used without further purification.

The ketone derivatives such as employed in Example 12 above can be prepared by condensing cyclammonium quaternary salts containing alkoxymethyl or aryloxymethyl groups with anhydrides of carboxylic acids. The following example will serve to illustrate the preparation of such ketone derivatives.

*Example 27.—2-(acetylphenoxymethylene)-3-methylbenzothiazoline*

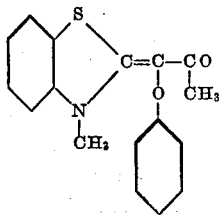

2.41 g. (1 mol.) of 2-phenoxymethylbenzothiazole and 1.86 g. (1 mol.) of methyl p-toluenesulfonate were heated together at the temperature of the steam bath for 32 hours. To the crude quaternary salt were added, with shaking, 10 cc. of acetic anhydride and 2.02 g. (2 mols.) of triethylamine. This reaction mixture was heated at the refluxing temperature for 15 minutes. A portion of the solvent was removed under reduced pressure and the residue was stirred with water and cracked ice. After making strongly alkaline with 40 per cent aqueous sodium hydroxide and further chilling, the solid was collected on the funnel and washed with water. The yield of product was 82 per cent crude and 50 per cent after two recrystallizations from ligroin (boiling point 90°–120° C.). The buff needles had melting point 141°–142° C.

We have found that our new dyes spectrally sensitized photographic silver halide emulsions when incorporated therein. The dyes are especially useful for extending the spectral sensitivity of the customarily employed gelatino-silver-chloride, gelatino-silver-chlorobromide, gelatino-silver-bromide and gelatino-silver-bromiodide developing-out emulsions. In the foregoing examples, the extent to which gelatino-silver-bromiodide developing-out emulsions can be sensitized as well as the point of maximum sensitivity are pointed out in connection with the dye of each example. To prepare emulsions sensitized with one or more of our new dyes, it is only necessary to disperse the dye or dyes in the emulsions. The methods of incorporating dyes in emulsions are simple and are known to those skilled in the art. In practice, it is convenient to add the dyes to the emulsions in the form of a solution in an appropriate solvent. Methanol has proved satisfactory as a solvent for most of our new dyes. Where the dyes are quite insoluble in methyl alcohol, such as the dyes of Examples 10a and 10b, for instance, a mixture of methanol and pyridine is advantageously employed as a solvent. The dyes are advantageously incorporated in the finished, washed emulsions and should be uniformly distributed throughout the emulsions.

The concentration of the dyes in the emulsions can vary widely, e. g. from 5 to 100 mg. per liter of flowable emulsion. The concentration of the dyes will vary according to the type of emulsion and according to the effect desired. The suitable and most economical concentration for any given emulsion will be apparent to those skilled in the art, upon making the ordinary tests and observations customarily used in the art of emulsion making. To prepare a gelatino-silver-halide emusion sensitized with one or more of our new dyes, the following procedure is satisfactory:

A quantity of dye is dissolved in methyl alcohol (or a mixture of methyl alcohol and pyridine) and a volume of this solution, which may be diluted with water, containing from 5 to 100 mg. of dye, is slowly added to about 1000 cc. of gelatino-silver-halide emulsion, with stirring. Stirring is continued until the dye is thoroughly dispersed in the emulsion.

With most of our dyes, from 10 to 20 mg. of dye per liter of gelatino-silver-bromide or bromiodide emulsion (containing about 40 g. of silver halide) suffices to produce the maximum sensitizing effect. With the finer grain emulsions, somewhat larger concentration of dye may be needed to produce the maximum sensitizing effect.

The above statements are only illustrative, as it will be apparent that the dyes can be incorporated in photographic emulsions by any of the other methods customarily employed in the art, e. g. by bathing a plate or film upon which an emulsion is coated in a solution of the dye in an appropriate solvent. However, bathing methods are ordinarily not to be preferred. Emulsions sensitized with the dyes can be coated on suitable supports, such as glass, cellulose derivative film, resin film or paper in the usual manner.

What we claim as our invention and desire to be secured by Letters Patent of the United States is:

1. The carbocyanine dyes which can be represented by the following general formula:

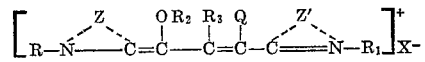

wherein R and $R_1$ represent alkyl groups of the formula $C_nH_{2n+1}$ wherein $n$ represents a positive integer of from 1 to 2, $R_2$ represents a member selected from the group consisting of aryl groups of the benzene series and aryl groups of the naphthalene series, $R_3$ represents a member selected from the group consisting of a hydrogen atom and alkyl groups of the formula $C_nH_{2n+1}$ wherein $n$ represents a positive integer of from 1 to 2, Q represents a member selected from the group consisting of a hydrogen atom, alkoxyl groups containing from 1 to 2 carbon atoms, aryloxyl groups of the benzene series, aryloxyl groups of the naphthalene series, Z and Z' each represents the non-metallic atoms necessary to complete a heterocyclic nucleus selected from the group consisting of those of the benzoxazole series, those of the benzothiazole series, those of the benzoselenazole series, those of the α-naphthoxazole series, those of the β-naphthoxazole series, those of the α-naphthothiazole series and those of the β-naphthothiazole series, and X represents an anion.

2. A 8,10-di(phenoxy)-3,3'-dimethyloxacarbocyanine salt of the following general formula:

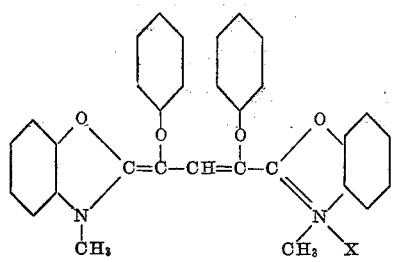

wherein X represents an anion.

3. 8,10-di(phenoxy)-3,3'-dimethyloxacarbocyanine perchlorate of the following formula:

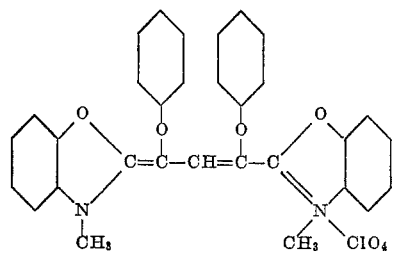

4. A 3,3'-dimethyl-8,10-di(m-toloxy)thiacarbocyanine salt of the following general formula:

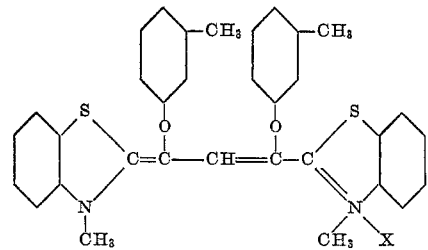

wherein X represents an anion.

5. 3,3'-dimethyl-8,10-di(m-toloxy)thiacarbocyanine bromide of the following formula:

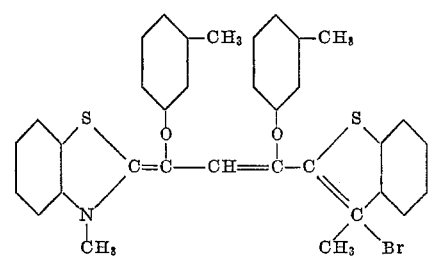

6. A 3,3'-dimethyl-8,10-diphenoxythiacarbocyanine salt of the following general formula:

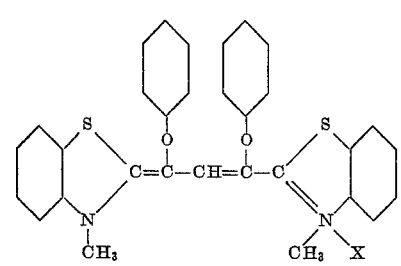

wherein X represents an anion.

7. 3,3'-dimethyl-8,10-diphenoxythiacarbocyanine bromide of the following formula:

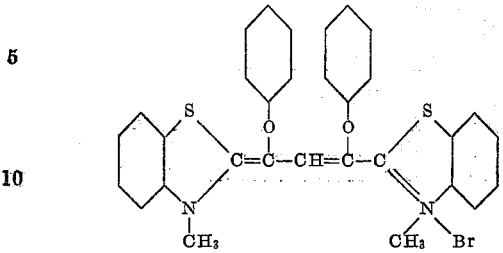

8. The carbocyanine dyes which can be represented by the following formula:

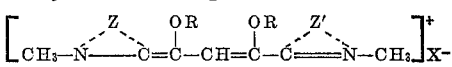

wherein R represents an aryl group of the benzene series, Z and Z' each represents the non-metallic atoms necessary to complete a hetercyclic nucleus selected from the group consisting of those of the benzoxazole series, those of the benzothiazole series, those of the benzoselenazole series, those of the α-naphthoxazole series, those of the β-naphthoxazole series, those of the α-naphthothiazole series and those of the β-naphthothiazole series, and X represents an anion.

9. A process for preparing a carbocyanine dye comprising condensing an ester of an orthocarboxylic acid with a cyclammonium quaternary salt selected from the group consisting of those of the benzoxazole series, those of the benzothiazole series, those of the benzoselenazole series, those of the α-naphthoxazole series, those of the β-naphthoxazole series, those of the α-naphthothiazole series and those of the β-naphthothiazole series containing, in the α-position to the quaternary nitrogen atom, a group selected from the group consisting of aryloxymethyl groups of the benzene series and aryloxymethyl groups of the naphthalene series.

10. A process for preparing a carbocyanine dye comprising condensing, in the presence of a basic condensing agent, an ester of an orthocarboxylic acid with a cyclammonium quaternary salt selected from the group consisting of those of the benzoxazole series, those of the benzothiazole series, those of the benzoselenazole series, those of the α-naphthoxazole series, those of the β-naphthoxazole series, those of the α-naphthothiazole series and those of the β-naphthothiazole series containing, in the α-position to the quaternary nitrogen atom, a group selected from the group consisting of aryloxymethyl groups of the benzene series and aryloxymethyl groups of the naphthalene series.

11. A process for preparing a carbocyanine dye comprising condensing an ester of an ortho carboxylic acid, in the presence of a pyridine condensing agent, with a cyclammonium quaternary salt selected from the group consisting of those of the benzoxazole series, those of the benzothiazole series, those of the benzoselenazole series, those of the α-naphthoxazole series, those of the β-naphthoxazole series, those of the α-naphthothiazole series and those of the β-naphthothiazole series containing, in the α-position to the quaternary nitrogen atom, a group selected from the group consisting of aryloxymethyl groups of the benzene series and aryloxymethyl groups of the naphthalene series.

LESLIE G. S. BROOKER.
FRANK L. WHITE.

(References on following page)

REFERENCES CITED

The following references are of record in the file of this patent:

UNITED STATES PATENTS

| Number | Name | Date |
|---|---|---|
| 2,060,023 | Brooker | Nov. 10, 1936 |
| 2,065,411 | Zeh | Dec. 22, 1936 |
| 2,083,804 | Zeh | June 15, 1937 |
| 2,156,464 | Schulz | May 2, 1939 |
| 2,292,001 | Walter | Aug. 4, 1942 |
| 2,335,861 | Kendall | Dec. 7, 1943 |

FOREIGN PATENTS

| Number | Country | Date |
|---|---|---|
| 466,097 | Great Britain | Dec. 22, 1936 |